May 19, 1936.  A. G. LAUCK ET AL  2,041,552
GLASSWARE FORMING MACHINE
Filed Oct. 23, 1933  4 Sheets-Sheet 2
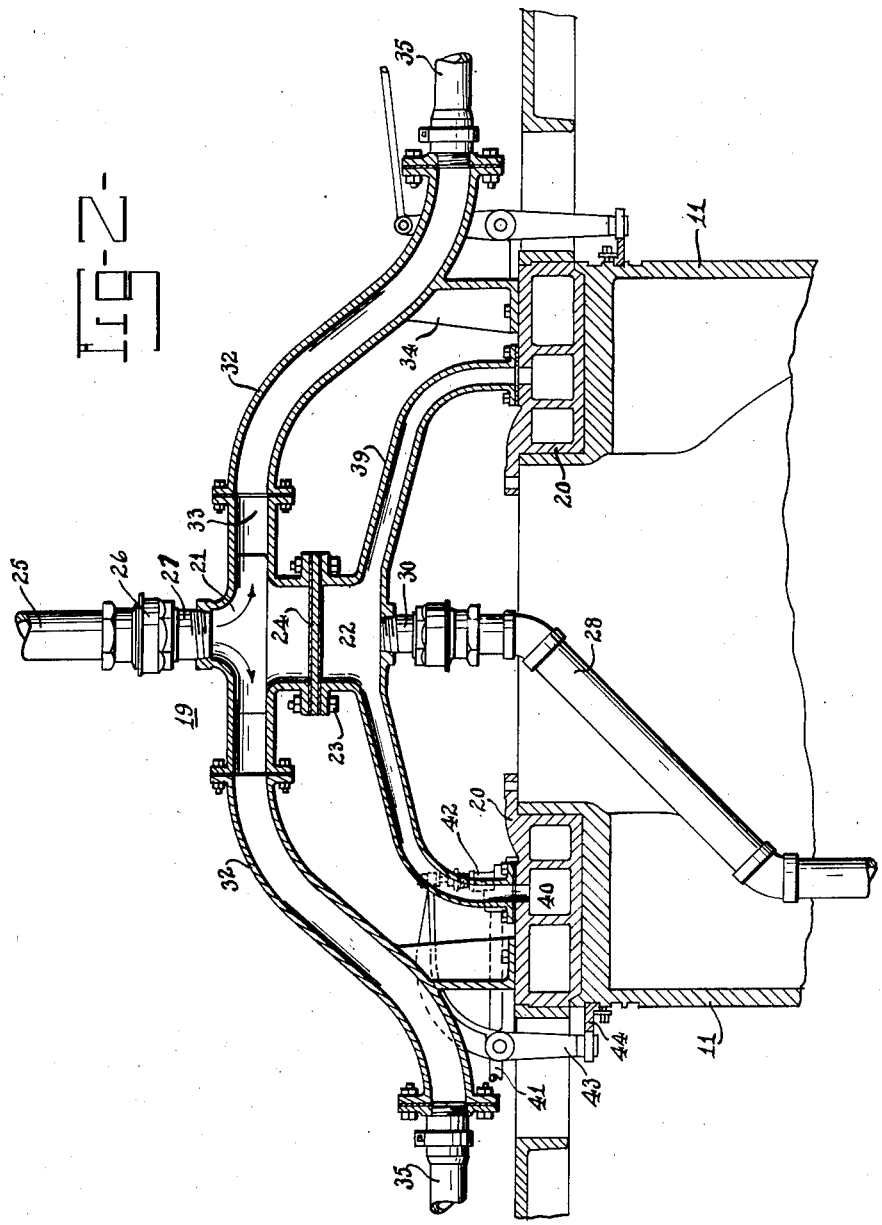

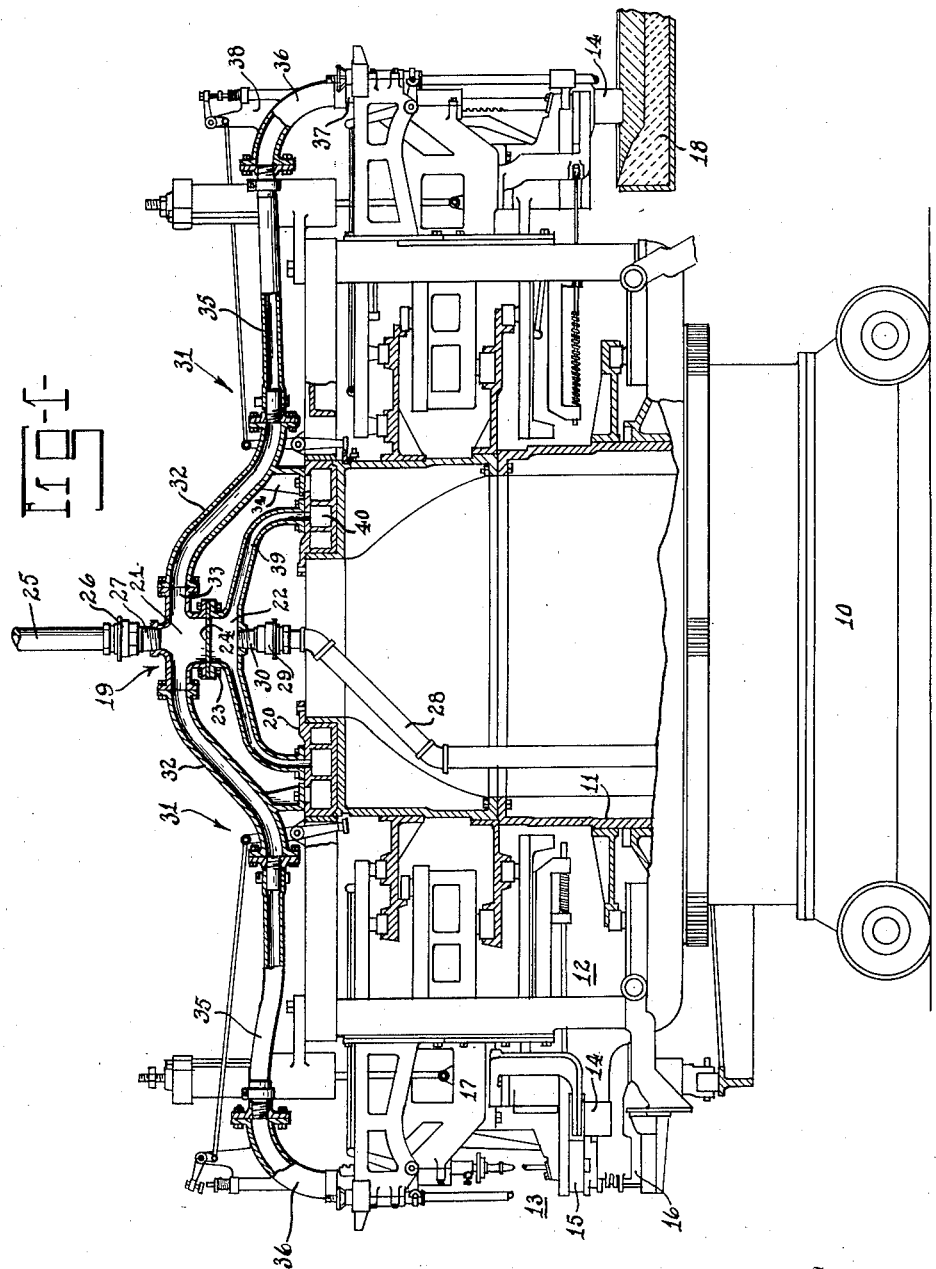

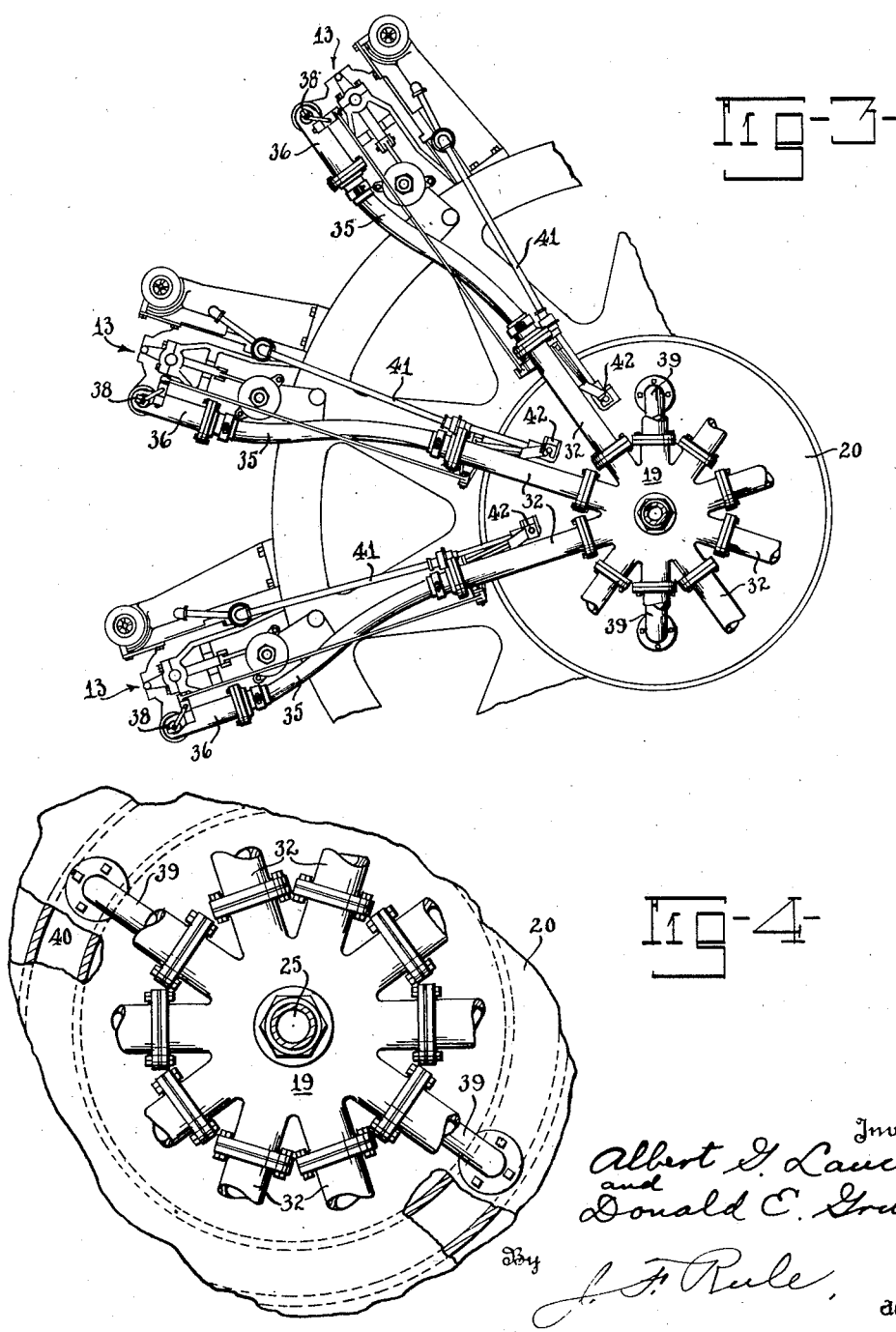

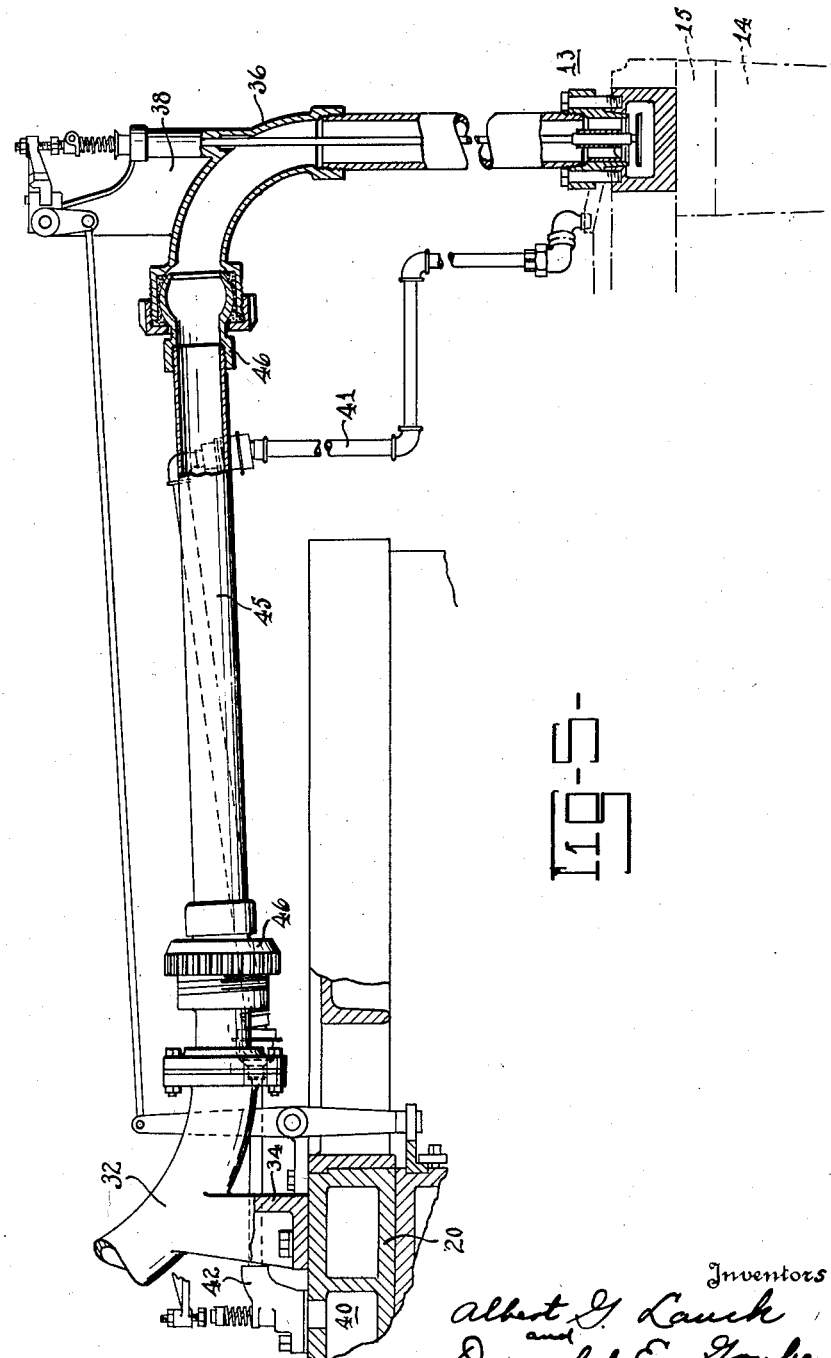

Patented May 19, 1936

2,041,552

UNITED STATES PATENT OFFICE 2,041,552

GLASSWARE FORMING MACHINE

Albert G. Lauck and Donald E. Grube, Alton, Ill., assignors to Owens-Illinois Glass Company, a corporation of Ohio Application October 23, 1933, Serial No. 694,798

1 Claim. (Cl. 49—5)

The present invention relates to improvements in machines for producing bottles and the like hollow containers and more particularly to machines of the well known Owens type in which the mold charges of molten glass are gathered into blank molds by suction or vacuum and then through a series of operations involving the application of air under pressure internally thereof, transformed into finished articles of glassware.

An object of the present invention is the provision of a novel distributing system for air under pressure and vacuum whereby leakage is greatly reduced and the structure involved materially simplified as compared to the apparatus employed heretofore. To this end the number of packed joints has been reduced very materially and the structure of the distributing head simplified to facilitate assembly by the average mechanic. Moreover, the pipe lines involved are of such form that tendency toward accumulation of sulphur and other foreign matter is held to a minimum.

Other objects will be in part apparent and in part pointed out hereinafter.

In the drawings:

Fig. 1 is a central vertical sectional view showing the invention in connection with a conventional form of Owens type machine.

Fig. 2 is a detail sectional view of the distributing head.

Fig. 3 is a fragmentary plan view.

Fig. 4 is a fragmentary plan view of the distributing head.

Fig. 5 is a sectional view showing in some detail a modified form of pipe connection between the distributing head and blank mold.

The machine in connection with which the present invention is illustrated is of conventional form and may be of the type shown in La France Patent 1,185,687, dated June 6, 1916, to which reference may be made for details of construction. A wheeled base 10 supports a stationary vertical central column 11 upon which a mold carriage 12 is rotatably supported, said mold carriage as is customary carrying an annular series of mold groups 13, each including a blank mold 14, neck mold 15, and finishing mold 16. The blank and neck molds are mounted upon a dipping frame 17 which is moved up and down at regular time intervals for the purpose of moving the blank mold into and out of contact with a pool of molten glass in a container 18. Stationary cams on the central column in part control dipping of the molds and various other operations as will be apparent by referring to the patent above identified.

Vacuum and air under pressure are employed in the transformation of mold charges of glass into finished articles. In the illustrated form of machine vacuum operates to lift the mold charges of glass into the blank molds 14 and air under pressure is utilized in compacting the mold charges in the blank mold and expanding the blanks to their final shape in the finishing molds 16. In order that loss of both vacuum and air under pressure through the pipes connecting the molds and sources of supply of vacuum and air may be greatly reduced and thereby permit efficient high speed operation of the machine, substantially the following construction is employed.

A distributing head 19 (Fig. 1) is mounted upon the central upper portion of the mold carriage, being connected directly to a drum 20. The distributing head includes a vacuum chamber 21 and air chamber 22 secured together by bolts 23 which also function to secure a partition 24 or wall in position to definitely separate and prevent communication between said vacuum and air chambers. A vacuum supply pipe 25 is connected through a rotary pipe joint 26 and through this joint and a short pipe 27 has communication with said vacuum chamber 21. A supply pipe 28 for air under pressure is connected through a rotary joint 29 and short pipe 30 to the air chamber 22. Both the vacuum and air supply pipes 25 and 28 respectively, are axially aligned with respect to the axis of rotation of the machine so that the distributing head 19 may rotate with the mold carriage relative to said supply pipes. Communication between the blank molds 15 and the vacuum chamber 21 may be obtained by means of a plurality of pipes 31 (Fig. 1) individual to the mold groups and each including a rigid pipe 32 connected to a port 33 in the vacuum chamber and curved outwardly and downwardly with its lower end secured by means of a foot 34 or bracket, to the circular drum 20. Flexible pipes 35 connect the outer ends of the rigid curved pipes 32 and rigid elbow pipes 36, the latter communicating with the upper ends of the usual vertical vacuum pipes 37 constituting a part of the mold groups. A bracket 38 on each elbow pipe 36 supports part of mechanism for actuating the vacuum control valve (not shown) both the valve and actuating mechanism being of conventional form, such for example, as illustrated in the patent above identified.

The air pressure chamber 22 includes two or more radial pipes 39 through which said chamber is rigidly connected to a circular air chamber 40 in the drum 20. Pipes 41 individual to the mold groups connect the circular air chamber 40 and the neck mold. A valve 42 for each of the pipes 41 is operated by a lever 43 and cam 44 at regular time intervals for the purpose of permitting flow of air under pressure to the neck mold during the blank forming operation and final expansion of the blank in the finishing mold.

In operation the machine rotates as does the conventional form and as is obvious the vacuum and air supply pipes 25 and 28 remain stationary. Because of the long radii of the curves or bends in the pipes 32 and elbow pipes 36, the tendency to accumulate foreign matter such, for example, as sulphur, which is used extensively in bottle machine operation, is greatly reduced.

In Fig. 5 there is disclosed a slightly modified form of connection between the rigid pipes 32 and elbow pipes 36. In this form the pipes 45 are of rigid construction and connected by means of universal joints 46 to the adjacent ends of said rigid pipes and elbow pipes. Obviously other specific forms of pipes may well be employed, provided the finally assembled structure is such that up and down movement of the blank mold 14 and dipping frame 17 is permitted.

Modifications may be resorted to within the spirit and scope of the appended claim.

What we claim is:

In combination, a stationary central column, a mold carriage rotatably supported on the column, mold groups on said carriage, a circular drum constituting a part of the carriage and arranged at the upper end thereof, an air chamber in said drum having connection with said mold groups, an air and vacuum distributing head resting upon and attached to said drum, said head including superposed air and vacuum chambers having opposed flanged vertical openings, a combined closure and partition plate interposed between said chambers to separate them and close said opposed openings, means rigidly connecting said chambers and partition plate, pipes individual to and connecting the mold groups and the vacuum chamber, said pipes being connected substantially above the said partition plate, pipes providing communication between the air chambers in the head and drum, a pair of vertically aligned ports at the common vertical axis of said chambers, stationary vertically aligned pipes and means rotatably connecting the pipes and ports of said chambers whereby the latter may rotate with the mold carriage relative to said stationary pipes.

ALBERT G. LAUCK.
DONALD E. GRUBE.